(12) United States Patent
Wick (10) Patent No.: US 6,580,519 B1
(45) Date of Patent: Jun. 17, 2003

(54) METHOD AND APPARATUS FOR DETERMINING THE ALIGNMENT OF ROTATIONAL BODIES

(76) Inventor: William R. W. Wick, 4889 Mercedes Dr., Suite B, Hamilton, OH (US) 45011

(*) Notice: Subject to any disclaimer, the term of this patent is extended or adjusted under 35 U.S.C. 154(b) by 0 days.

(21) Appl. No.: 09/526,928

(22) Filed: Mar. 16, 2000

Related U.S. Application Data (60) Provisional application No. 60/124,588, filed on Mar. 16, 1999.

(51) Int. Cl.[7] .............................................. G01B 11/14
(52) U.S. Cl. ...................... 356/614; 356/615; 356/399; 356/400; 33/286
(58) Field of Search ................................ 356/400, 399, 356/614, 615, 139.01, 138, 153, 152.1; 33/286, 412; 250/559.37, 206.1, 206.2, 231.13, 231.14

(56) References Cited

U.S. PATENT DOCUMENTS

| | | | |
|---|---|---|---|
| 3,126,643 A | 3/1964 | Barbknecht et al. | 33/180 |
| 3,840,301 A | 10/1974 | Pyor et al. | 356/109 |
| 4,276,480 A | 6/1981 | Watson | 250/560 |
| 4,750,141 A | 6/1988 | Judell et al. | 364/550 |
| 4,916,824 A | 4/1990 | Shimazutsu et al. | 33/551 |
| 5,001,356 A | 3/1991 | Ichikawa | 250/560 |
| 5,067,817 A | 11/1991 | Glenn | 356/376 |
| 5,107,132 A | 4/1992 | Garcia Pastor et al. | 250/560 |
| 5,210,593 A | 5/1993 | Krämer | 356/381 |
| 5,435,073 A * | 7/1995 | Sulllivan et al. | 33/286 |
| 5,519,944 A | 5/1996 | Delastre | 33/533 |
| 5,617,645 A | 4/1997 | Wick et al. | 33/551 |
| 6,040,903 A * | 3/2000 | Lysen et al. | 356/153 |
| 6,434,849 B1 * | 8/2002 | Hermann | 33/529 |

FOREIGN PATENT DOCUMENTS

JP    1295108    11/1989

OTHER PUBLICATIONS

"Digilaser–Fast, Easy & Precise," (technical brochure) Fixturlaser AB.

* cited by examiner

Primary Examiner—Frank G. Font
Assistant Examiner—Layla Lauchman
(74) Attorney, Agent, or Firm—Thompson Hine LLP (57) ABSTRACT

A method for determining the alignment of a rotational body. The method includes the steps of locating a sensor on an outer surface of a rotational body, targeting a reference laser beam at the sensor such that the reference laser beam intersects the sensor at a reference coordinate, and recording the reference coordinate. The method further includes rotating the rotational body about the axis of rotation of the rotational body, targeting a measurement laser beam at the sensor such that the measurement laser beam intersects the sensor at a measurement coordinate, and comparing the reference coordinate and the measurement coordinate.

24 Claims, 7 Drawing Sheets

METHOD AND APPARATUS FOR DETERMINING THE ALIGNMENT OF ROTATIONAL BODIES

This application claims priority to U.S. Provisional Application Serial No. 60/124,588, filed Mar. 16, 1999.

The present invention is directed to methods and apparatuses for measuring the alignment of rotational bodies, and more particularly, to methods and apparatuses for measuring the alignment of rotational bodies using a laser and a sensor mounted onto the rotational body.

BACKGROUND OF THE INVENTION

In manufacturing and other industries, machines utilizing a variety of rollers, gears, shafts, axles and other rotational bodies are commonly used. The axes of the various rotating bodies must be aligned to ensure proper functioning of the machines. Of particular interest for alignment purposes are out-of-square measurements (the deviation of the rotational axis of the rotational body with respect to a vertical plane passing through the rotational axis) and out-of-level measurements (the deviation of the rotational axis of the rotational body with respect to a horizontal plane passing through the rotational axis). In order to measure out-of-square of a particular rotational body, typically a reference plane is established, and a measurement device is passed across the face of the rotational body (i.e., along the length of the rotational body). The reference plane may be defined by a laser, a wire, a rope, or the like. The measurement device cooperates with mechanical or electronic distance-measuring apparatuses as the measurement device is passed along the face of the rotational body to detect the out-of-square or out-of-level measurements relative the reference plane. Alternately, the distance between the reference plane (e.g., a taut string) and various points on a rotational body may be manually measured to calculate out-of-level.

However, these measurement methods require access to the face of the rotational body, and are therefore ineffective when the rotational body is surrounded by other components or is otherwise inaccessible. In this case, the alignment of the rotational body cannot be measured, or the machine must be partially or fully disassembled to gain access to the rotational body. However, the disassembly of the machine is inconvenient and time consuming. Furthermore, disassembly of the machine alters the machine's operating characteristics, and the resulting measurements may not present a true picture of the alignment of the rotational body during operation. Furthermore, taking manual measurements is time consuming and often imprecise.

Accordingly, there is a need for a method and an apparatus for detecting the alignment of a rotational body that can quickly and accurately measure the out-of-square and out-of-level of the rotational body without requiring access to the face of the body.

SUMMARY OF THE INVENTION

The present invention is a method and apparatus for measuring the alignment of rotational bodies that is quick and accurate. The invention uses real-time laser measurements to measure out-of-square and out-of-level quickly and accurately, and can carry out such measurements without access to the front surface of the body. Furthermore, because the measurements are displayed in real time, the rotational body may be manually adjusted, and the system provides immediate feedback such that the rotational body can be located in the desired position. The present invention may also be used to measure both out-of-square and out-of-level without changing the location or setup of measuring equipment.

In a preferred embodiment, the invention is a method for determining the alignment of a rotational body. The method includes the steps of locating a sensor on an outer surface of a rotational body, targeting a reference laser beam at the sensor such that the reference laser beam intersects the sensor at a reference coordinate, and recording the reference coordinate. The method further includes rotating the rotational body about the axis of rotation of the rotational body, targeting a measurement laser beam at the sensor such that the measurement laser beam intersects the sensor at a measurement coordinate, and comparing the reference coordinate and the measurement coordinate.

Accordingly, it is an object of the present invention to provide a method and apparatus for measuring the alignment of rotational bodies that is quick and accurate. Other objects and advantages of the present invention will be apparent from the following description and the accompanying drawings.

DETAILED DESCRIPTION

Figure 1:
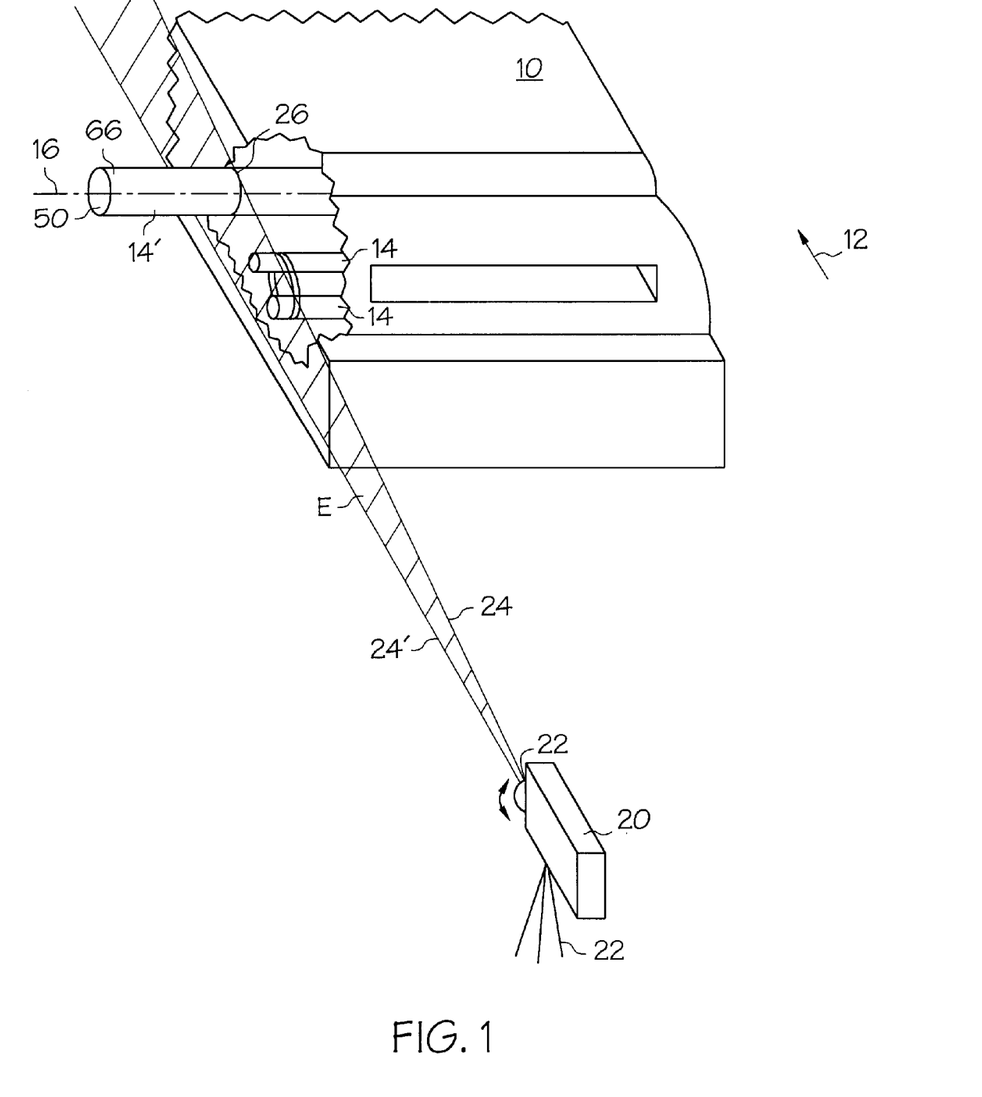
FIG. 1 is a front perspective view of a preferred embodiment of the alignment system of the present invention, shown in association with a machine having a rotational body.
Figures 2, 5:
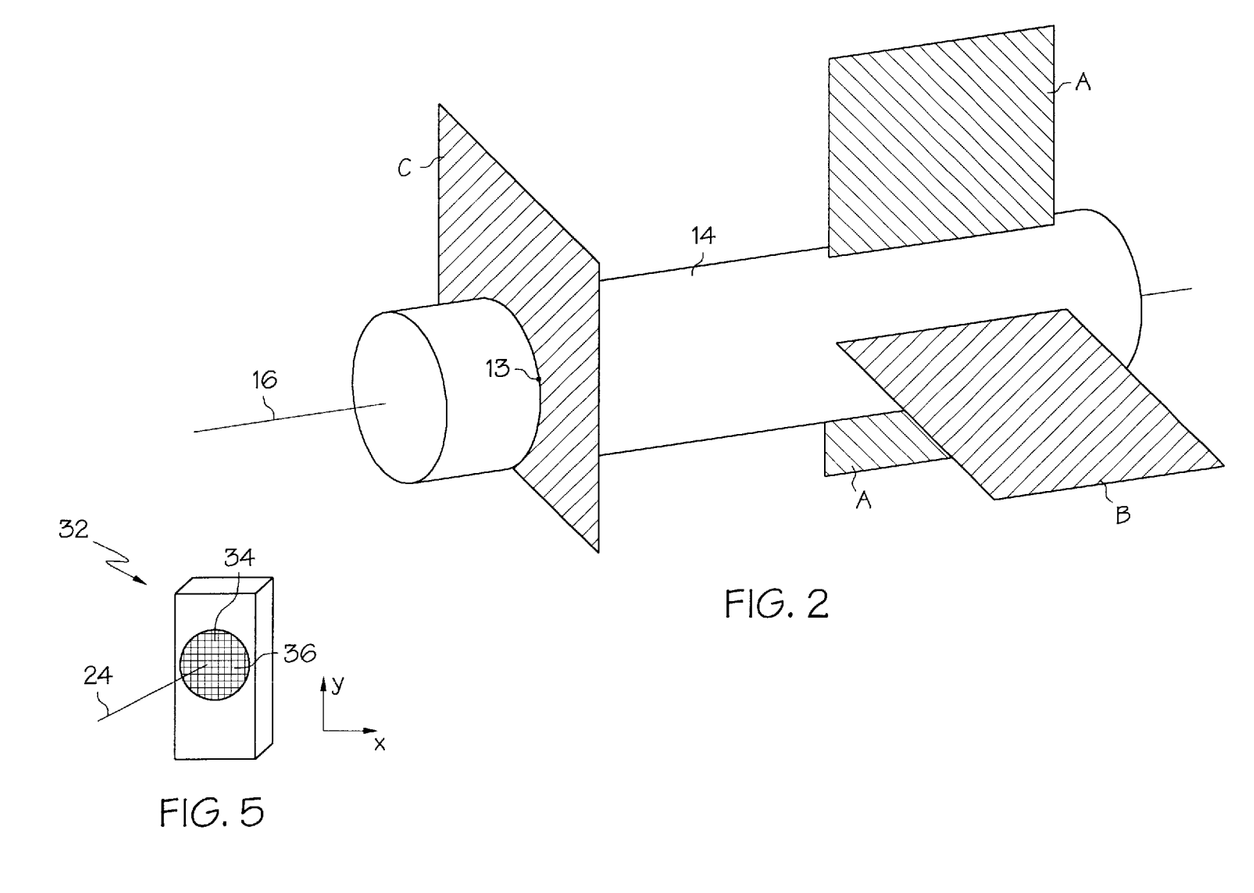
FIG. 2 is a detail perspective view of a rotational body to be measured with the present invention.
FIG. 5 is a front perspective view of one embodiment of a sensor used with the alignment system of the present invention.

As shown in FIG. 1, a machine, generally designated 10, treats workpieces (not shown) that are passed downstream through the machine 10 in the direction indicated by arrow 12. The machine 10 includes one or more rollers or rotational bodies 14', 14 that may act upon and/or treat the workpieces, transmit forces to other rotational bodies 14, or perform other functions. The rotational bodies 14 may be nearly any type of rotating members, including gears, rollers, shafts, pulleys, axles, rolls, belt drives and the like. Each rotational body 14 rotates about an axis 16, and each rotational body 14 is preferably aligned with the axes of the machine 10 and with the rotational axes 16 of the other rotational bodies 14. With reference to FIG. 2, a rotational body 14 is preferably aligned with plane A and plane B.

Plane A represents the vertical plane of the machine 10 and plane B represents the horizontal plane of the machine 10. In order to ensure proper functioning of the machine 10, it is desired to align the axis 16 of the rotational body 14 with plane A and plane B. Out-of-square of the body 14 is measured by the deviation of the axis 16 from the vertical plane A and out-of-level of the body 14 is determined by the deviation of the axis 16 from the horizontal plane B.

Plane C represents a plane that is swept when a point, for example point 13 on the body 14 is swept 360° during a rotation of the body 14. The plane C is necessarily perpendicular to the rotational axis 16. A reference plane E, termed the baseline plane (not shown in FIG. 2) is perpendicular to the plane A and the plane B. The present invention measures the alignment of the rotational body 14 by measuring the deviation of plane C relative plane E. By comparing the horizontal and vertical alignment of plane C relative the baseline plane E, the out-of-square and out-of-level of the rotational body 14 can be determined.

FIG. 1 schematically illustrates the various components of one embodiment of the alignment system of the present invention. A laser emitter 20 is aligned with plane A and plane B (not shown in FIG. 1) of the machine 10, and is plumb to the ground. The laser emitter 20 may be any acceptable emitter, such as a model FL 11 laser transmitter manufactured by Fixtur-Laser of Molndal, Sweden. In a preferred embodiment, the laser emitter 20 is supported on a tripod 22, and the tripod 22 is centered above one or more marks on the machine floor (not shown) so that repeatable measurements may be taken. In this case, plugs may be mounted in the floor and punch marks are formed in the plugs that define a reference line for aligning the emitter 20. The laser emitter 20 includes a pivotal guide 22 that is movable in a vertical plane. Because the laser emitter 20 is aligned with plane A and plane B of the machine, the laser 24 emitted by the laser emitter 20 is movable in plane E that is perpendicular to plane A and plane B. FIG. 1 illustrates two possible positions for the laser, shown as 24 and 24', and plane E is illustrated as the plane between the lasers 24 and 24'. Thus, the laser 24 may be swept generally vertically within the plane E. The rotatable body 14 intersects plane E at a locus of points shown as a circle 26.

Figure 3:
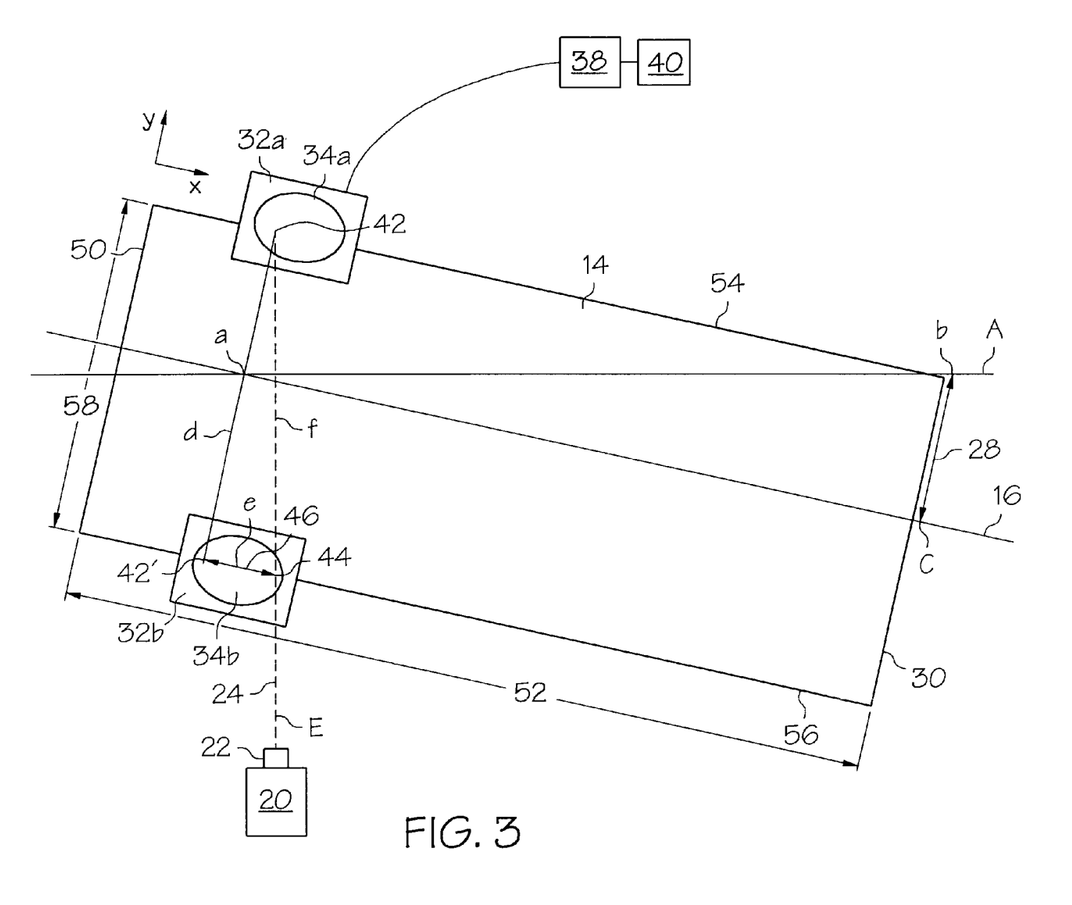
FIG. 3 is a front schematic representation of the alignment system and rotational body of FIG. 1.
Figure 6:
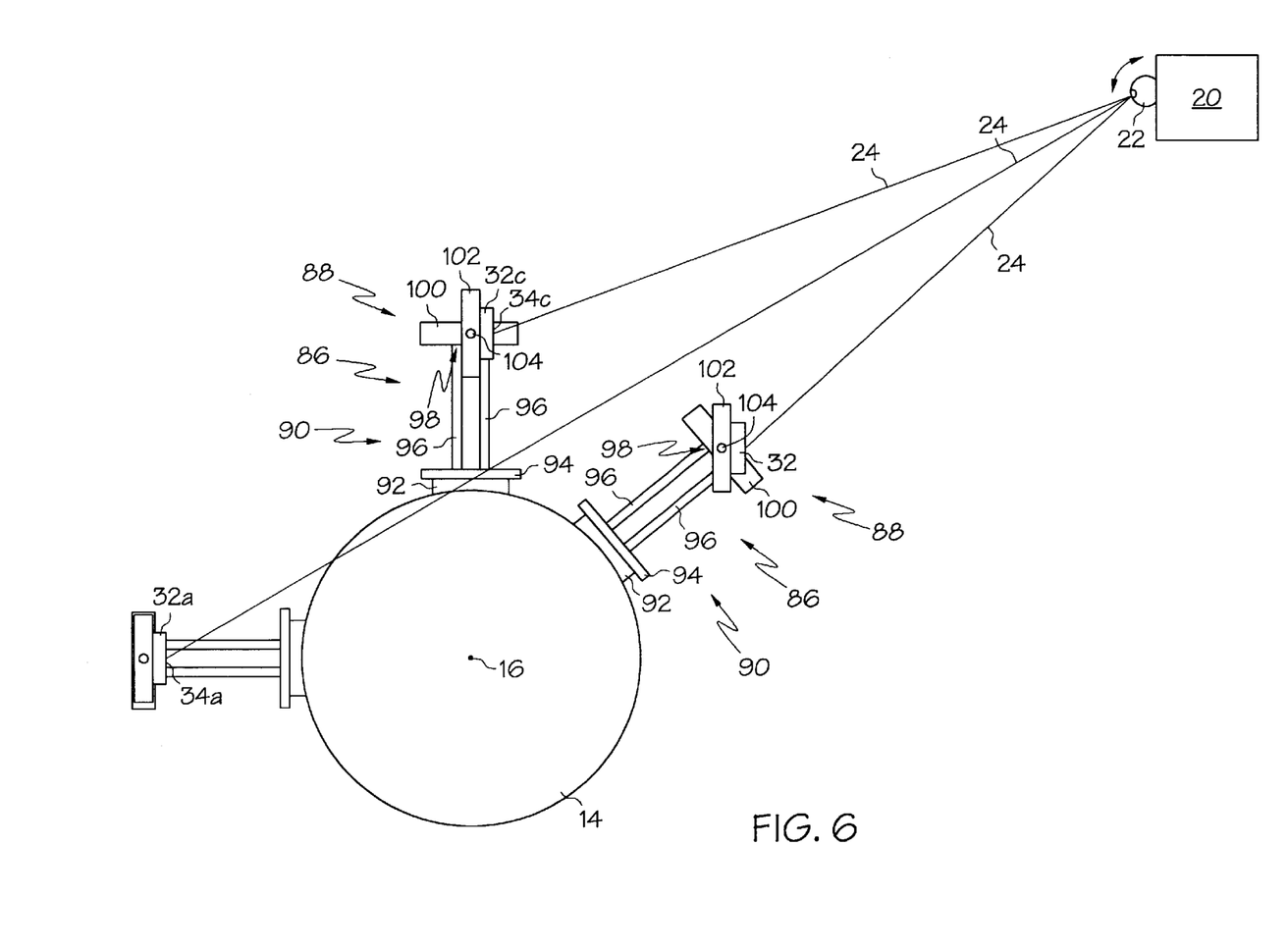
FIG. 6 is a side view of the alignment system and rotational body of FIG. 1, shown with a sensor mounting system, the rotational body and sensor mounting system being shown in a variety of positions.
Figure 8:
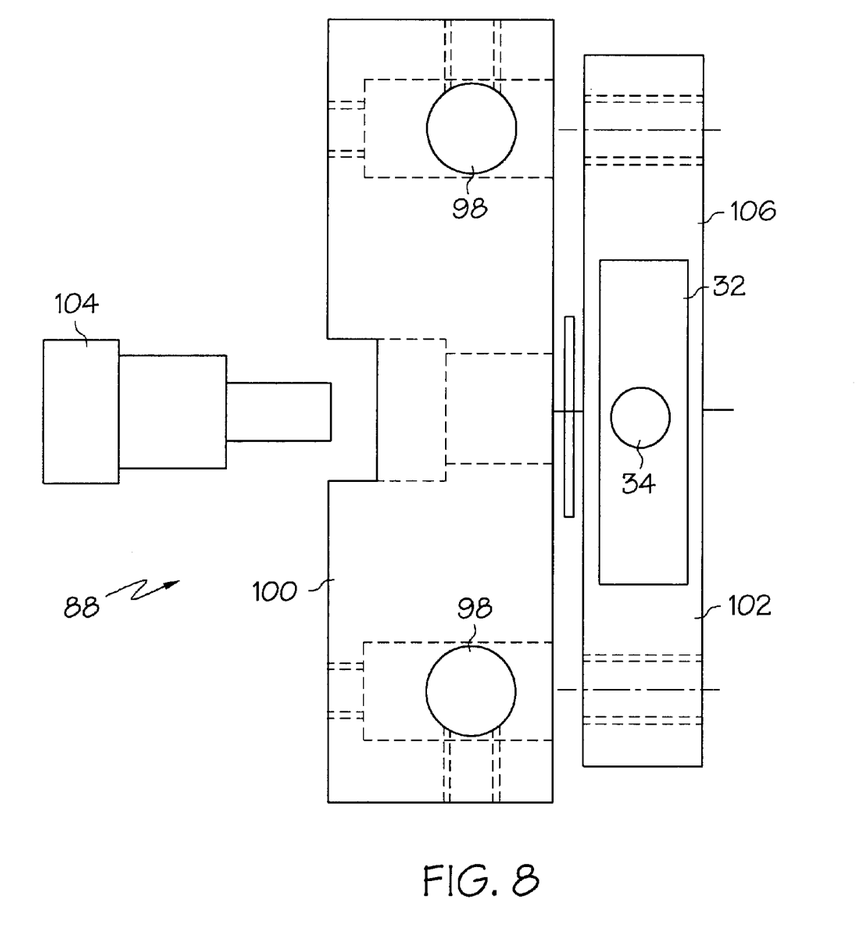
FIG. 8 is a front view of the sensor carrier of the sensor mounting system of FIG. 6, shown with a sensor mounted thereon.
Figure 9:
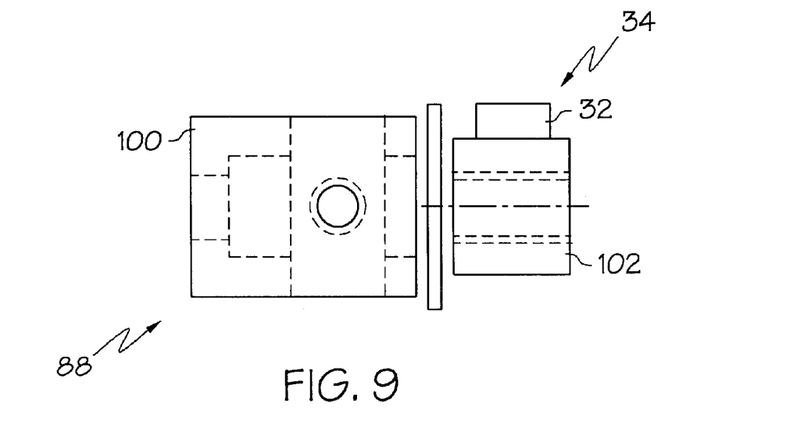
FIG. 9 is an end view of the sensor carrier and sensor of FIG. 8.

FIG. 3 is a top schematic view of a rotational body 14 and laser emitter 20 of FIG. 1. The body 14 is shown having a out-of-square deviation; that is, the axis 16 of the body 14 deviates from the vertical plane A of the machine by a distance 28 at the distal end surface 30 of the body 14. In order to measure the out-of-square deviation, a sensor 32 is mounted onto the body 14. The sensor 32 is shown in greater detail in FIG. 5, and includes a face 34 having a grid 36 thereon. The sensor 32 includes its own xy coordinates system, as shown in FIG. 5. When a laser 24 hits the sensor face 34, the sensor 32 can sense the xy location of the laser 24 relative to a reference position on the face 34. The sensor 32 can transmit the xy location data to a computer 38 or other processing device (FIG. 3), that can process the raw data and supply an output signal to an output device 40. The output device 40 displays the output, for example, as xy coordinates. The xy coordinates represents the position on the sensor 32 that the laser 24 hits relative the reference point on the sensor face 34. The sensor 32 is mounted to the rotational body 14 such that it always faces the laser emitter 20. One such mechanism for mounting the sensor 32 is shown in FIGS. 6 and 8–9, and is described in greater detail below.

The sensor 20 is mounted on the body 14 such that it can receive the laser 24 from the laser emitter 20. For example, in FIG. 1, although the sensor is not shown, it may be mounted at any point on the body such that the sensor face 34 intersects with the circle 26. Returning to FIG. 3, the sequence for determining the out-of-square deviation for the body 14 will now be described. As noted above, the out-of-square deviation is the distance that the axis 16 of the body 14 deviates from the vertical plane A of the machine at the distal end surface 30 of the body 14, indicated by distance 28 of FIG. 3. The out-of-square deviation shown in FIG. 3 is greatly exaggerated, for ease of illustration, beyond the normally expected deviation. In order to measure the out-of-square of the body 14, the body is rotated about its rotational axis 16 until the sensor 32 is located at a 9 o'clock position. The sensor is shown as sensor 32a having sensor face 34a in this position in FIG. 3, and is also shown in the 9 o'clock position as sensor 32a in FIG. 6. Next, the laser guide 22 is vertically adjusted such that the laser emitter 20 emits a laser 24 that is received on the sensor face 34a. The laser 24 hits the sensor face 34a at point 42 (FIG. 3). The sensor 34a registers the location that the laser 24 hits the sensor face 34a, and sends the signal to the computer 38. The x location of where the laser 24 hits the sensor face 34a is of particular interest, and the y location may be disregarded. Next, the x location of where the laser 24 hits the sensor 32a is preferably "zeroed out" by the computer 38 or user such that this x value becomes a reference point for any subsequent measurements.

Next, the body 14 is rotated 180° about its axis 16 such that the sensor 32 is in the 3 o'clock position. The sensor is shown in this location in FIG. 3 as sensor 32b. The laser guide 22 is then adjusted within the plane E until the laser hits the sensor face 34b at point 44. The x coordinate where the laser 24 hits the sensor face 34b is then sent to the computer 38 and displayed as an output. In FIG. 3, the point where the laser 24 hit the sensor face 34 when the rotational body 14 was in the 9 o'clock position is shown as 42 on the sensor face 34b. The display device 40 then displays the numerical value of the distance 46, which represents the distance between point 42' and point 44. The distance 46 represents the deviation of the rotational body 14 with respect to the baseline plane E. Using the value of the distance 46, the value of the distance 28, which represents the distance between the plane A and the axis 16 of the body 14 at the distal end surface 30 of the body 14, may be calculated.

The value for the distance 28 may be calculated as follows. From analyzing the geometric relations of FIG. 3, it is seen that the triangle defined by points 42, 42' and 44 is substantially equal to the triangle abc in terms of angles and relative side lengths. For ease of calculations, the triangle defined by points 42, 42', and 44 has sides labeled d, e, and f, as shown in FIG. 3. Side e represents the distance 46. The triangle having points a, b, and c has sides ab, bc, and ca. Accordingly, a ratio of the lengths of the sides of the triangles may be set up wherein:

$$\frac{e}{d} = \frac{bc}{ca} \tag{Eq. 1}$$

Rearranging Equation 1, it seen that:

$$bc = \frac{e * ca}{d} \tag{Eq. 2}$$

As shown in FIG. 3, the distance of the side ca is the lateral distance (x- distance) between the point 42 and the distal end surface 30 of the body 14. However, this distance can be accurately approximated by measuring the distance between the midpoint of the sensor face 34 and the distal end surface 30 of the body 14. Furthermore, although not shown in FIG. 3, the sensor 32 is preferably located over the end surface 50 of the body 14 such that the distance of side ca is substantially equal to the length 52 of the body 14. Although the sensor 32 is not shown located adjacent the end surface 50 of the body in FIG. 3, the sensor 32 is moved away from the end surface 50 for illustrative purposes. In a preferred embodiment, the sensor face 34 is centered over the end surface 50.

The distance represented by the side d is the distance between the point 42 and the point 42'. This distance may also be measured, but in the illustrated embodiment the distance of the side d is substantially equal to the diameter 58 of the body 14. Again, this is a preferable arrangement wherein the sensor 32 is located near the outer sides 54, 56 of the body 14 when the measurements are taken.

Thus, substituting into Equation 2, it is seen that the distance 28 (side bc) can be calculated by multiplying the measured x deviation 46 (side e) by the of the length 52 of the rotational body 14 (side ca), and dividing the result by the diameter 58 of the body 14 (side d). Because the diameter 58 of the body and the length 52 of the body 14 may be measured directly, the value of the out-of-square (distance 28) of the rotational body 14 can be calculated. The computer 38 may also be programmed to calculate this value and display it on the display device 40.

Once the value for the out-of-square distance 28 is determined, the body 14 may be adjusted the desired amount in the desired direction such that the out-of square deviation is zero. For example, in the illustrated embodiment, the body 14 may be rotated around point a until the axis 16 is aligned with plane A. Alternately, because the display device 40 displays a real time value of the distance 28, the body 14 may be manually adjusted until the displayed value for the distance 28 is zero. At this point, the rotational axis 16 of the body is aligned with the plane A, and the out-of-square deviation is zero.

Figure 4:
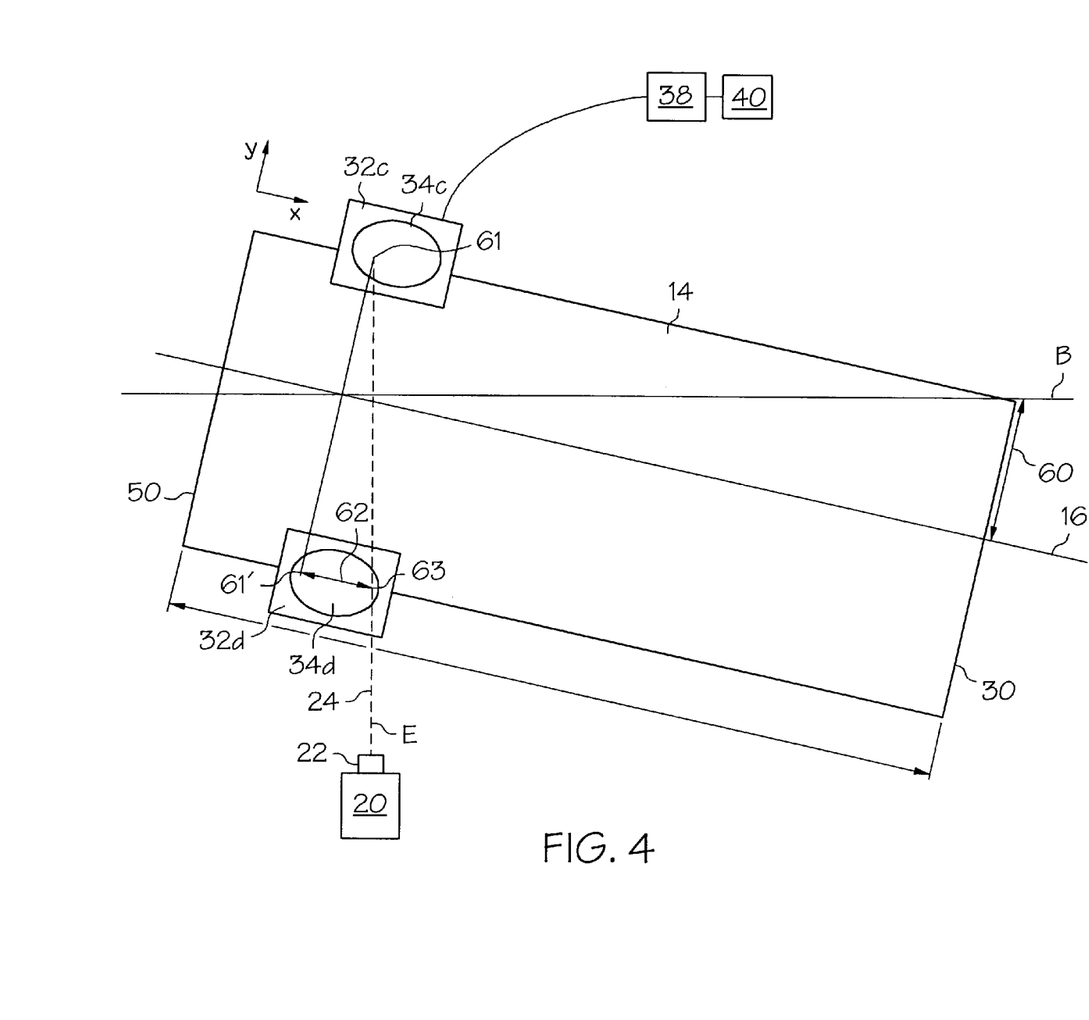
FIG. 4 is a top schematic representation of the alignment system and rotational body of FIG. 1.

The measurements and dimensions to measure the out-of-level for the body 14 are shown in FIG. 4, which is a front elevational view of the body 14 and laser emitter 20 of FIG. 1. Again the deviation 60 of the body from the plane B is exaggerated for ease of illustration. To measure the out-of-level of the body 14, the body 14 is moved about its rotational axis 16 until the sensor 32 is located at the 12 o'clock position, shown as sensor 32c at this point in FIG. 4. The sensor is shown in this position as sensor 32c in FIG. 6 as well. The laser guide 22 is then adjusted within plane E until the laser 24 hits the sensor face 34c of the sensor 32c at location 61. The laser 24 may be termed the reference laser at this point. The x position where the laser hits the sensor face is provided to the computer 38 and displayed on the output device 40. Again, this value for the x location is preferably zeroed out such that it is a reference point for any subsequent measurements.

The body 14 is then rotated about its rotational axis 16 such that the sensor is located at the 6 o'clock position, shown as sensor 32d in FIG. 4. The laser emitter 20 is then adjusted such that the laser 24 hits the sensor face 34d. The laser 24 may be termed the measurement laser at this point. The sensor 32 then provides an output as to the x location where the laser 24 hits the sensor face 34d. The distance in the x direction 62 between where the laser 24 hits the sensor at the 12 o'clock location (61) and at the 6 o'clock position (63) is displayed on the output device 40. As above, the distance 60 between the axis of rotation 16 of the body 14 and the plane B may be calculated by dividing the measured distance 62 by the distance between point 61' and point 61, and by multiplying the result by the lateral distance along the Y axis between the point 61 and the distal end surface 30 of the body 14. As before, the alignment system is preferably calibrated such that the distance between the point 61' and point 61 is the diameter of the rotational body 14, and the lateral distance between the point 61 and the distal end surface 30 of the body 14 is the length of the body 14. Also, as was the case above, the body 14 may be manually adjusted while viewing the output device 40 until the displayed value for the distance 62 is zero, at which time the out-of-level deviation 60 of the body 14 is zero.

In this manner, both the out-of-square and out-of-level measurements of a rotational body may be measured simply by taking measurements at 12 o'clock, 6 o'clock and 3 o'clock and 9 o'clock. The system need not be disassembled or moved in order to take the different sets of measurements. Measurements may be taken at other rotational positions and the rotational body may thereby be aligned, or its deviations calculated. Mathematical transformations may have to be conducted upon the data if out-of-square and out-of-level values are required based upon measurements taken at positions other than at 3, 6, 9, and 12 o'clock.

Another advantage of the present invention is that any portion of the rotational body 14 that is exposed may be used to take the requisite measurements, such as the exposed portion 66 of the member 14 in FIG. 1. The exposed portion 66 may have the sensor 32 attached thereto such that the required measurements may be taken. Furthermore, even if there is no exposed portion, an extension may be located on the rotational body 14, and the sensor 32 mounted on the extension to carry out the calibration. The baseline plane E may also be defined by diverting the laser 24. For example, it may be inconvenient to align the emitter 20 so that the laser 24 is in the same plane as the end surfaces 30, 50 of the body 14. In this case, the emitter may aligned and/or located in a variety of positions, and the laser 24 deflected to form the plane E. For example, the emitter may be aligned such that the resultant laser 24 is parallel to the axis 16 of the body 14, and the laser 24 may be diverted 90 degrees to thereby form the baseline plane E. A variety of positions and configurations of the system in this manner are possible.

It should be understood that although a preferred method of calibrating the rotational body is described, the specifics of the method may be varied without departing from the scope of the invention. For example, the order of taking measurements may vary, and the equipment, including the sensor 34 and laser emitter 20 may be replaced with other equipment that achieves the same or equivalent results. The system may also be used to calibrate rotational bodies having non-circular cross sections, such as bodies having square hexagonal, or gear-shaped cross sections.

Figure 7:
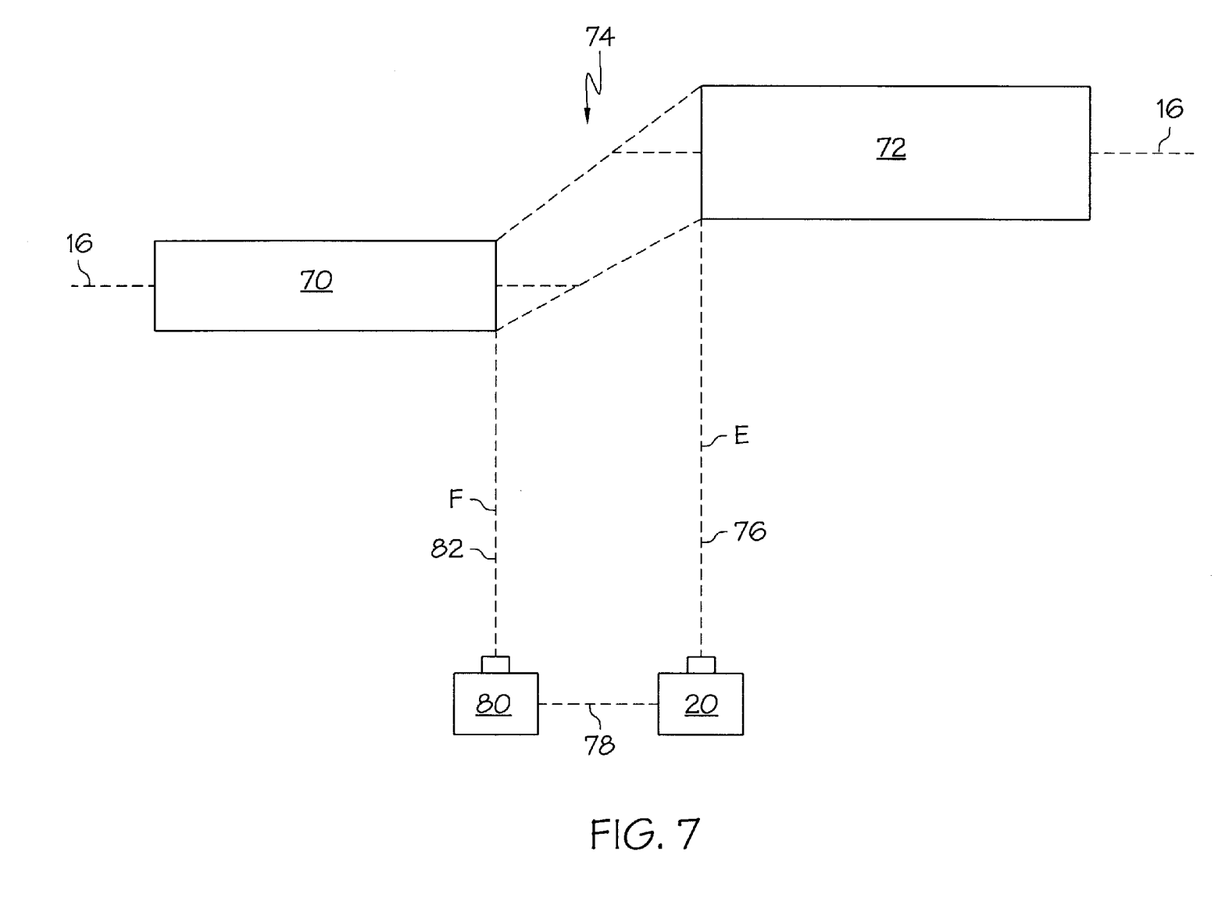
FIG. 7 is a top schematic illustration of an alternate embodiment of the alignment system of the present invention, shown with a pair of rotational bodies.

As shown in FIG. 7, the present invention may be used to calibrate two non-overlapping rotating elements 70, 72 to ensure that they are parallel. For example, the shaft 70 may be a driving shaft 70 that is connected to driven shaft 72 by a transmission shaft and a pair of universal joints, or other driving or connecting means shown generally as 74. A laser emitter 20 emits a laser 76 that is movable in a vertical plane. The laser 76 defines a plane E and the driven shaft 72 is calibrated to plane E in a manner described above. After the driven shaft 72 is calibrated, a prism (not shown) in the laser emitter 20 is moved into the path of the laser 76 and diverts the laser 76 such that a bridging laser 78 comes out of the side of the laser emitter 20 perfectly perpendicular to the laser 76. Reflector 80 receives the bridging laser 78 therein, and has a prism therein (not shown) that deflects the bridging laser 78 perpendicular to the path of the bridging laser 78. The resultant laser 82 is parallel to the laser 76 and to plane E. Laser 82 defines a second baseline reference plane F. The driving shaft 70 may then be aligned to the plane F in the same manner described above. After the driving shaft 70 is aligned, the driving shaft 70 is parallel to the driven shaft 72.

As noted above, the sensor 32 is mounted to the rotational body 14 such that it may face the laser emitter 20 at all times. A preferred mounting system 86 for mounting the sensor 32 to the rotational body 14 is shown in FIGS. 6 and 8–9. The mounting system 86 (FIG. 6) includes a sensor carrier 88 and a mounting portion 90. The mounting portion 90 includes a magnet 92 shaped to abut against the rotational body 14 to mount the mounting system 90 to the rotational body 14. Various other methods, such as fasteners, brackets, clamps, wires, rope, and the like may be used to attach the mounting system 90 to the body 14. A support 94 is coupled to the magnet 92, and the support 94 includes a pair of posts 96 extending generally outwardly therefrom. The posts are received in a pair of holes 98 a frame 100 of the sensor carrier 88 (FIG. 8).

A support 102 is pivotably coupled to the frame 100 by means of a shoulder bolt 104. The support 102 receives the sensor 32 thereon, and is free to rotate relative the frame 100 and mounting portion 90. This free rotation helps to ensure the sensor face 34 faces the laser emitter 20. As shown in FIG. 6, the sensor carrier 102 is shown in the 12 o'clock, 9 o'clock, and 1:30 positions, and the support 102 is mounted such that the sensor 32 carried thereon can face a laser 24 from a stationary, adjustable laser emitter 20. The sensor 32 may be mounted on any available surface on the support 102, and in a preferred embodiment is mounted on the outer mounting surface 106 (FIG. 8). Nearly any mechanism that can receive the sensor 32 thereon, and that can pivot relative the body 14 to allow the sensor 32 to receive the laser 24 on its sensor face 34 may be used without departing from the scope of the invention.

Having described the invention is detail and by reference to preferred embodiments thereof, it will be apparent that modifications and variations are possible without departing from the scope of the invention.

What is claimed is:

1. A method for determining the alignment of a rotational body comprising the steps of:

locating a sensor on an outer surface of a rotational body;

targeting a reference laser beam at said sensor such that said reference laser beam intersects said sensor at a reference coordinate;

recording said reference coordinate;

rotating said rotational body about the axis of rotation of said rotational body;

targeting a measurement laser beam at said sensor such that said measurement laser beam intersects said sensor at a measurement coordinate; and comparing said reference coordinate and said measurement coordinate.

2. The method of claim 1 further comprising the step of calculating an out-of-square or out-of-level measurement of said rotational device based upon the difference, in an axial direction, between said reference coordinate and said measurement coordinate.

3. The method of claim 1 further comprising the step of outputting said compared coordinates to an output device, and adjusting said rotational body while monitoring said displayed compared coordinates to align said rotational body.

4. The method of claim 3 wherein said adjusting includes moving said rotational body such that said reference coordinate is approximately equal to said measurement coordinate.

5. The method of claim 1 wherein said comparing includes calculating the difference, in an axial direction of said rotational body, between said reference coordinate and said measurement coordinate.

6. The method of claim 5 further comprising the step of calculating a deviation of said body by multiplying said calculated axial difference by the length of said rotational body, and dividing the result by the effective diameter of said body.

7. The method of claim 1 wherein said sensor is mounted adjacent an end surface of said rotational body during both of said targeting steps.

8. The method of claim 1 wherein said reference laser beam is vertically aligned with said measurement laser beam.

9. The method of claim 1 wherein said rotating step includes rotating said rotational body about 180 degrees.

10. The method of claim 9 further comprising the step of rotating said rotational body about 90 degrees, and repeating said targeting, recording, rotating, targeting and comparing steps to determine both out-of-square and out-of-level measurements of said body.

11. The method of claim 10 wherein said rotational body is located at a three o'clock location during said first targeting step.

12. The method of claim 1 wherein said recording and said comparing are accomplished with use of a processor.

13. The method of claim 1 further comprising the step of providing a laser beam source that provides said reference laser beam and said measurement laser beam, and locating said laser beam source at a predetermined location spaced apart from said rotational body.

14. The method of claim 1 wherein the alignment of said rotational body is determined with respect to a machine having a set of perpendicular baseline planes, and wherein said reference laser and said measurement laser lie in a plane parallel to one of said baseline planes.

15. The method of claim 1 wherein said sensor is rotated along with said rotational body during said rotating step.

16. A method for aligning a pair of rotational bodies comprising the steps of:

aligning said one of said pair of rotational bodies using a pair of reference lasers that form a reference plane;

locating a sensor on an outer surface of the other one of said pair of rotational bodies;

generating an auxiliary laser beam that is parallel to said reference plane;

targeting said auxiliary laser beam at said sensor;

recording a coordinate at which said auxiliary laser beam intersects said sensor;

rotating said other one of said pair of rotational bodies about the axis of rotation said rotational body;

targeting said auxiliary laser beam at said sensor; and comparing the coordinate at which said auxiliary laser beam intersects said sensor during said second targeting step to the coordinate at which said auxiliary laser beam intersects said sensor during said first targeting step.

17. An apparatus for determining the alignment of a rotational body comprising:

a laser beam source for emitting laser beams;

a sensor having a sensor surface and being shaped to be mounted to an outer surface of said rotational body and for receiving a laser beam, said sensor providing an output of at least one coordinate where a laser beam is received on said sensor surface; and a processor receiving at least two coordinates output from said sensor and for calculating a difference between said received coordinates.

18. The apparatus of claim 17 wherein said processor calculates and displays the out-of-square or out-of-level deviation of said rotational body based upon said calculated difference.

19. An apparatus for determining the alignment of a rotational body comprising:

a laser beam source for emitting laser beams;

a sensor having a sensor surface and being shaped to be mounted to an outer surface of said rotational body and for receiving a laser beam, said sensor providing an output of at least one coordinate where a laser beam is received on said sensor surface; and an output device connected to said sensor for displaying said at least one coordinate.

20. The apparatus of claim 19 wherein said sensor includes a mounting portion, and wherein said sensor surface is pivotably mounted to said mounting portion such that said sensor face can face said laser beam source at all rotational positions of said rotational body.

21. The apparatus of claim 19 wherein said laser beam source is located at a predetermined position spaced apart from said rotational body.

22. The apparatus of claim 19 wherein said senor is mounted to an outer surface of said rotational body.

23. The apparatus of claim 19 wherein said laser source is capable of emitting a plurality of laser beams in a vertical plane.

24. The apparatus of claim 19 wherein said sensor includes a base that is shaped to be magnetically attached to said rotational body.

* * * * *